United States Patent
Kim et al.

(10) Patent No.: US 9,571,316 B2
(45) Date of Patent: Feb. 14, 2017

(54) METHOD AND APPARATUS FOR DESIGNING FREQUENCY-SPATIAL FILTER WITH VARIABLE BANDWIDTH

(71) Applicant: Electronics and Telecommunications Research Institute, Daejeon (KR)

(72) Inventors: Chung Sup Kim, Daejeon (KR); Kang Hee Kim, Daejeon (KR); Ki Cheol Tae, Daejeon (KR); Sang Won Kim, Daejeon (KR); Heung Yong Kang, Daejeon (KR); Yong Seok Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/007,755

(22) Filed: Jan. 27, 2016

(65) Prior Publication Data
US 2016/0294589 A1 Oct. 6, 2016

(30) Foreign Application Priority Data
Apr. 2, 2015 (KR) .................. 10-2015-0046973

(51) Int. Cl.
*H04L 27/148* (2006.01)
(52) U.S. Cl.
CPC .................. *H04L 27/148* (2013.01)
(58) Field of Classification Search
CPC ................................................ H04L 27/148

USPC .......................... 375/260, 267, 316
See application file for complete search history.

(56) References Cited

U.S. PATENT DOCUMENTS

| 7,027,421 | B2 | 4/2006 | Park et al. | |
|---|---|---|---|---|
| 7,623,563 | B2 | 11/2009 | Jwa et al. | |
| 8,909,174 | B2 | 12/2014 | Howard et al. | |
| 2004/0008614 | A1* | 1/2004 | Matsuoka | H04B 7/082 370/203 |
| 2009/0233567 | A1* | 9/2009 | Catreux | H04B 7/0615 455/273 |
| 2016/0021661 | A1* | 1/2016 | Yerramalli | H04W 16/14 370/329 |

FOREIGN PATENT DOCUMENTS

EP 1276251 B1 5/2011

* cited by examiner

*Primary Examiner* — Freshteh N Aghdam
(74) *Attorney, Agent, or Firm* — William Park & Associates Ltd.

(57) ABSTRACT

Provided herein is a method and apparatus for realizing a frequency-spatial filter with variable bandwidth, the method including generating M number of FFT channel blocks having N number of channels by performing an N point FFT (Fast Fourier Transform) processing using M number of array antenna inputs; combining some of the N number of channels of each FFT channel block according to a frequency bandwidth variable parameter value; combining some of spatial response vector channels in a combined channel of each FFT channel block according to a spatial bandwidth variable parameter value; and combining all the channels and outputting the same.

10 Claims, 5 Drawing Sheets

FIG. 3
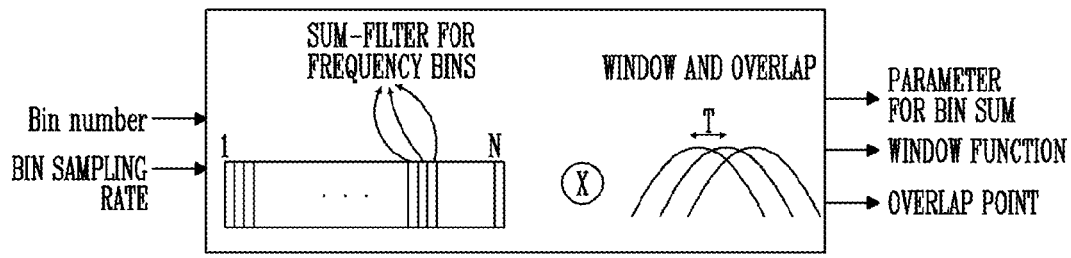
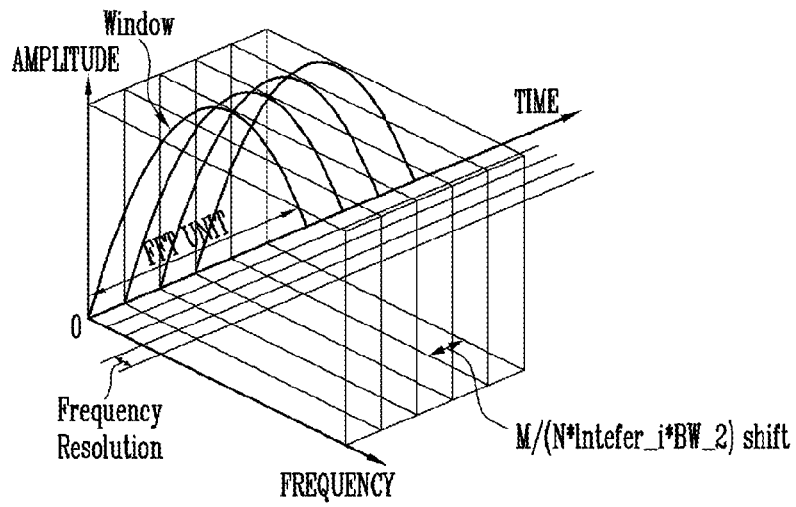
FIG. 4
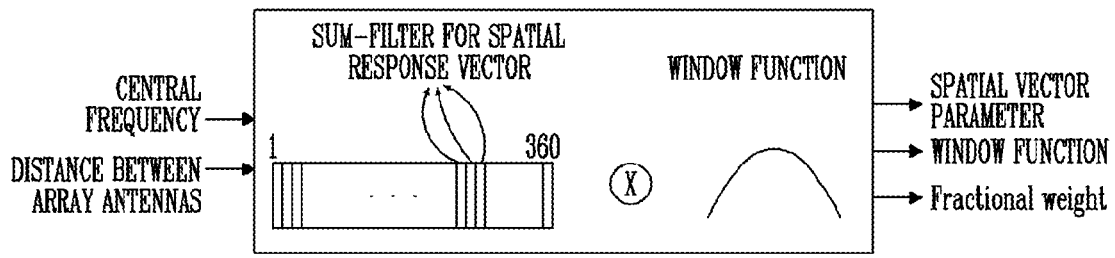

METHOD AND APPARATUS FOR DESIGNING FREQUENCY-SPATIAL FILTER WITH VARIABLE BANDWIDTH

CROSS-REFERENCE TO RELATED APPLICATION

The present application claims priority to Korean patent application number 10-2015-0046973, filed on Apr. 2, 2015, the entire disclosure of which is incorporated herein in its entirety by reference.

BACKGROUND

Field of Invention

Various embodiments of the present invention relate to a method and apparatus for designing a frequency-spatial filter with variable bandwidth.

Description of Related Art

Generally, a receiver used in a wireless communication system may perform base bandwidth signal processing on a certain broadband signal having a high sampling rate. Herein, the broadband signal is a combination of signals coming from all directions, and thus compared to a signal of a certain direction and frequency, interference and noise will increase, which is a problem.

In order to improve such a problem, it is necessary to perform base bandwidth signal processing on signals received from a plurality of antenna into a plurality of frequency related narrowbands, but the number of array antenna, selected frequency and FFT resolution limit the available space and frequency bandwidth and the like. Especially, the recent spatial filters using digital beam formation are unable to easily form a beam bandwidth due to limitations of the number of antenna and the like. Therefore, it is necessary to develop a high performance spatial-frequency bandwidth filter that has a simple structure, consistency, and ability to adjust a bandwidth and selectively remove spatial interference.

SUMMARY

Various embodiments of the present invention are directed to a method and apparatus for realizing a frequency-spatial filter with variable bandwidth having a simple structure and ability to support various bandwidths regarding a plurality of channels simultaneously.

One embodiment of the present invention provides a method for realizing a frequency-spatial filter with variable bandwidth, the method including generating M number of FFT channel blocks having N number of channels by performing an N point FFT (Fast Fourier Transform) processing using M number of array antenna inputs; combining some of the N number of channels of each FFT channel block according to a frequency bandwidth variable parameter value; combining some of spatial response vector channels in a combined channel of each FFT channel block according to a spatial bandwidth variable parameter value; and combining all the channels and outputting the same.

Another embodiment of the present invention provides an apparatus for realizing a frequency-spatial filter with variable bandwidth, the apparatus including a controller configured to generate M number of FFT channel blocks having N number of channels by performing an N point FFT (Fast Fourier Transform) processing using M number of array antenna inputs; to combine some of the N number of channels of each FFT channel block according to a frequency bandwidth variable parameter value; to combine some of spatial response vector channels in a combined channel of each FFT channel block according to a spatial bandwidth variable parameter value; and to combine all the channels and output the same.

According to the present disclosure, it is possible to provide a frequency-spatial filter with variable bandwidth that has a simple structure, efficiency, and ability to support various bandwidths.

BRIEF DESCRIPTION OF THE DRAWINGS

The above and other features and advantages of the present invention will become more apparent to those of ordinary skill in the art by describing in detail embodiments with reference to the attached drawings in which:

FIG. 3 is a view illustrating a method for controlling time and frequency filter and a relationship thereof in a frequency-spatial filter with variable bandwidth according to an embodiment of the present disclosure;

FIG. 4 is a view illustrating a method for controlling a spatial filter and a relationship between a spatial bandwidth and a direction in a frequency-spatial filter with variable bandwidth according to an embodiment of the present disclosure;

DETAILED DESCRIPTION

Figure 1:
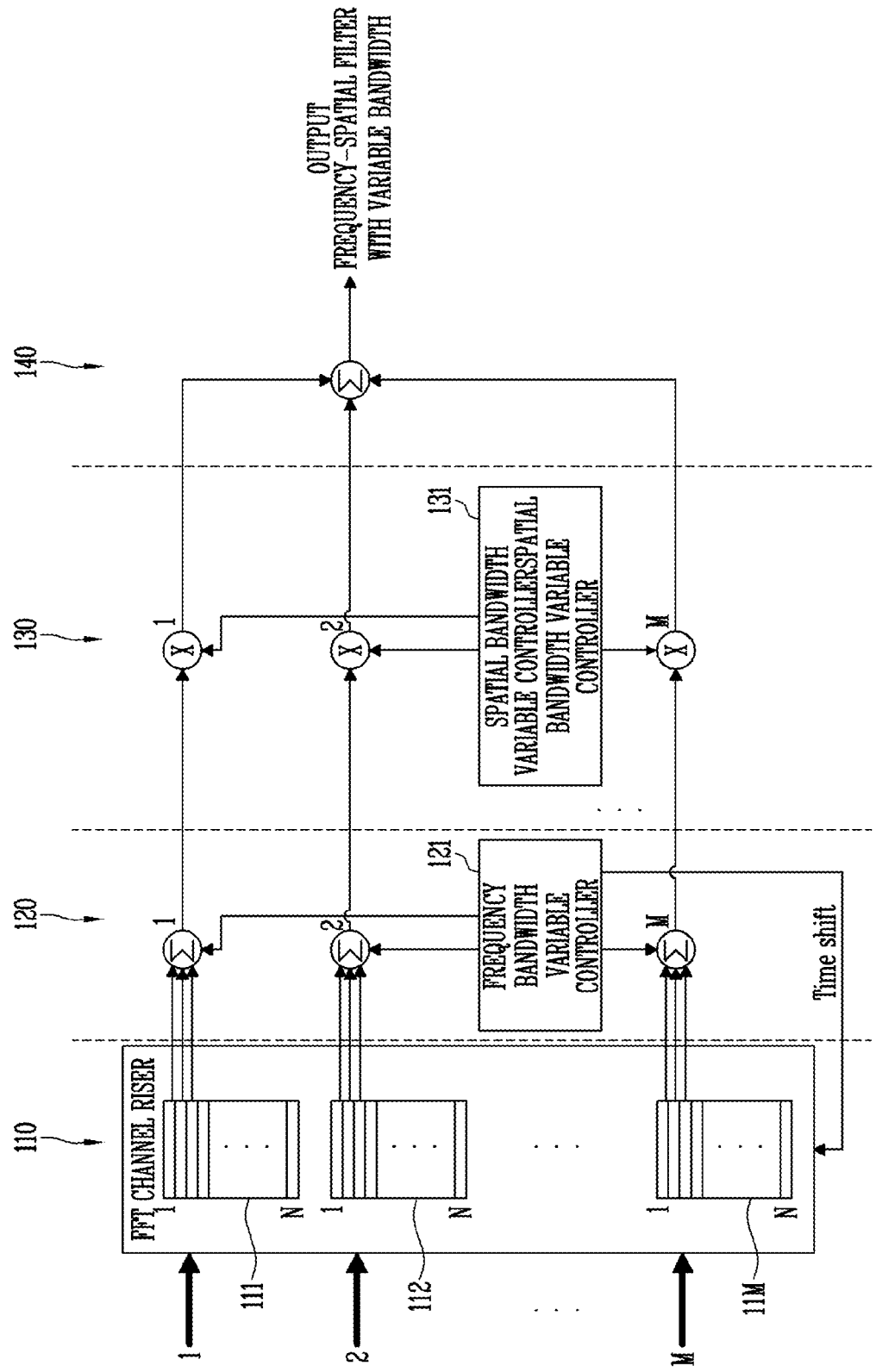
FIG. 1 is a view illustrating a method for realizing a frequency-spatial filter with variable bandwidth according to an embodiment of the present disclosure.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly connected or accessed to another component or indirectly connected or accessed through another component.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

FIG. 1 is a view illustrating a method for realizing a frequency-spatial filter with variable bandwidth according to an embodiment of the present disclosure.

Referring to FIG. 1, the method for realizing a frequency-spatial filter with variable bandwidth mainly consists of four steps. First, a first step (110) is a step of performing N point FFT (Fast Fourier Transform) using M number of array antenna inputs, and generating M*N number of FFT channel blocks 111, 112, . . . , 11M. Herein, a basic bandwidth of a frequency bandwidth filter may be obtained from sampling frequency (Fs)/N. Furthermore, if there are two or more time shifter inputs received of a frequency bandwidth variable controller, the FFT channel blocks are converted into M*N*time shifter, and the basic bandwidth of the frequency filter becomes Fs/N*time shifter, thereby forming a basic structure of the frequency variable filter.

Next, a second step (120) is a step of receiving input of a set value from the frequency bandwidth variable controller 121 and configuring a bandwidth filter using a method of combining certain channels of among the N channels. A signal processing in such a frequency bandwidth variable controller 121 is structurally the same as a signal processing of a spatial bandwidth variable controller 122 that will be explained hereinafter, and such structures being the same provides an advantage of reducing the size and amount of calculation when realizing H/W.

Then, a third step (130) is a step of receiving input of a set value from the spatial bandwidth variable controller 131 and configuring a spatial bandwidth filter using a method of combining certain spatial response vector channels in the same manner as in step 120. As aforementioned, since the structures of the frequency variable bandwidth filter and the spatial variable bandwidth filter are the same, it is possible to reduce the size and amount of calculation when realizing H/W. At step 130, it is possible to receive a spatial interference removal value by the spatial bandwidth variable controller 131 and remove any interference of a certain spatial bandwidth.

Meanwhile, in FIG. 1, the frequency bandwidth variable controller 121 and the spatial bandwidth variable controller 131 are configured in separate blocks, each block performing different functions from each other, but such an illustration is just for the sake of technical convenience, and thus the functions may not be necessarily be separated. For example, the functions of the frequency bandwidth variable controller 121 and the spatial bandwidth variable controller 131 may be performed by one controller.

Lastly, a fourth step (140) is a step of combining all the output values output at step 130 and completing the outputting of a frequency-spatial bandwidth filter.

As aforementioned, it is easy to standardize a method for realizing a frequency-spatial filter with variable bandwidth, and thus is advantageous in realizing an FPGA (Field-Programmable Gate Array), and it is possible to realize a variable bandwidth filter control value regarding a frequency-space using a structure of memory and the like with only a small amount of calculation.

Figure 2:
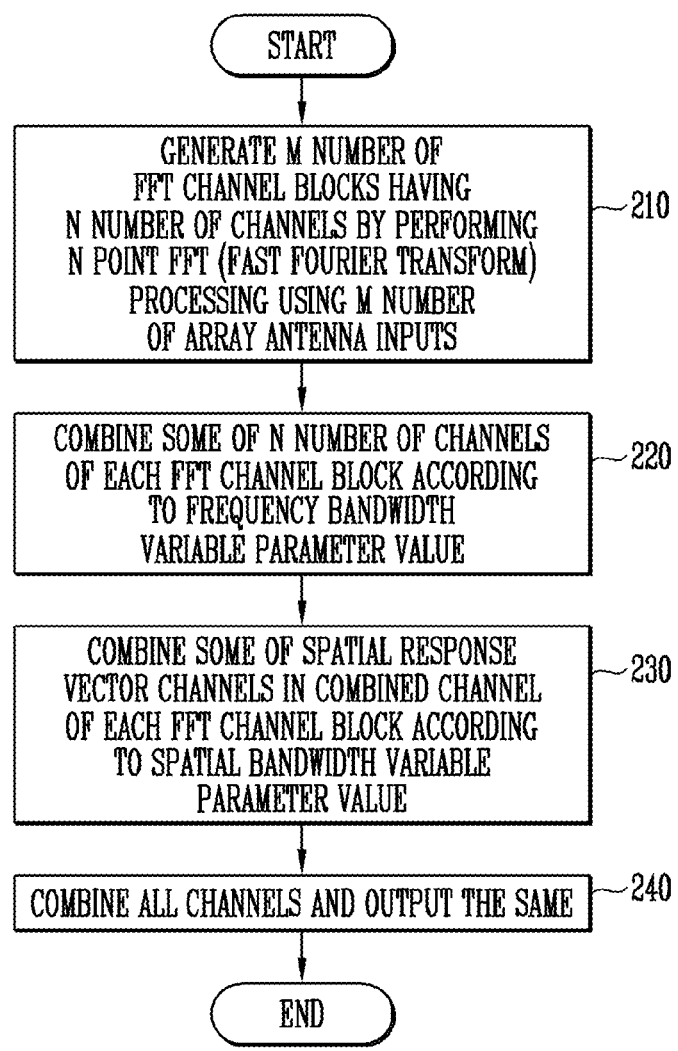
FIG. 2 is a flowchart illustrating a method for realizing a frequency-spatial filter with variable bandwidth according to an embodiment of the present disclosure.

FIG. 2 is a flowchart illustrating a method for realizing a frequency-spatial filter with variable bandwidth according to an embodiment of the present disclosure.

FIG. 2 illustrates the method of FIG. 1 by way of a flowchart. FIG. 2 is based on an assumption that the method for realizing a frequency-spatial filter with variable bandwidth is controlled by one controller. However, this is just an embodiment, and thus modifications can be made.

First of all, at step 210, M number of FFT channel blocks having N number of channels are generated by performing an N point FFT (Fast Fourier Transform) processing using M number of array antenna inputs. As explained at step 110 with reference to FIG. 1, a basic bandwidth of the frequency bandwidth filter may be obtained by sampling frequency (Fs)/N. Furthermore, according to an embodiment of the present disclosure, the controller controls such that the FFT channel blocks are converted into M*N*time shifter when there are two or more time shifter inputs, according to an input of the time shifter, in which case the basic bandwidth of the frequency filter may become Fs/N*time shifter.

Then, at step 220, according to a frequency bandwidth variable parameter value, some of the N number of channels of each FFT channel block are combined. That is, the controller configures the frequency bandwidth filter in a method of combining certain channels of the N channels, according to a set value. Such a configuration of the frequency bandwidth filter is illustrated in FIG. 3.

FIG. 3 is a view illustrating a method for controlling time and frequency filter and a relationship thereof in a frequency-spatial filter with variable bandwidth according to an embodiment of the present disclosure.

Referring to FIG. 3, it is possible to multiply a Sum-Filter for frequency bins with a window and its overlapped function based on a bin number and bin sampling rate, and select a parameter for bin sum, window function and overlap point. In such a case, the unit for performing the FFT may be M/(N*Interfer_i*BW_2). Herein, Interfer_i is a zero padding multiple number regarding M for minimizing interference of a multiple channel filter (the greater the zero padding multiple number, the smaller the interference), and BW_2 may be a value set (in this case, 2) such that the bandwidth of the channel combination is not against the sampling theory. According to FIG. 3, it is possible to minimize the algorithm of a downward frequency converter part using the fact that when moved temporarily, and the finally generated channel bandwidth is ½ of the sampling rate that occurs temporarily.

Such a signal processing on the frequency bandwidth filter is structurally the same as a signal processing of a spatial variable bandwidth filter that will be explained hereinafter, and such structures being the same has an advantage of reducing the size and amount of calculation when realizing H/W.

Back to FIG. 2, at step 230, some of the spatial response vector channels are combined in a combined channel of each FFT channel block according to the spatial bandwidth variable parameter value. It is configuring a spatial bandwidth filter using the method of combining certain channels of among the spatial response vector channels. FIG. 4 illustrates such a frequency bandwidth filter.

Referring to FIG. 4, it is possible to multiple a Sum-Filter for spatial response vector and window function based on a central frequency and a distance between array antennas, and select a spatial vector parameter, window function, and fractional weight. More specifically, the controller may configure a suitable spatial bandwidth filter that a user demands with inputs of the central frequency of a broadband signal, distance between array antenna, and incidence direction of signals. According to an embodiment of the present disclosure, unlike the frequency bandwidth filter and basic response vector, the array antenna response regarding direction becomes the basic vector of the spatial bandwidth filter. Herein, when configuring a spatial resolution by units of 1 degree, the array antenna response vector becomes Matrix M*360. The variable weighted frequency $F_{weight}$ value of the spatial filter bandwidth may be expressed in 2*k number of row vectors of spatial response matrix, and in math equation (1) as follows.

$$F_{weight} = \sum_{L=cen-k}^{cen+k} [A_L * W_{coeff}]$$ ⟨Math equation 1⟩

Herein, a condition $$Bw = \frac{d}{\lambda} < 0.5$$

must be satisfied. Herein, Cen means the central frequency. Furthermore, AL is the $L^{th}$ row vector of M*1 of the array antenna response vector, and the maximum value of k must be the same or smaller than the absolute value of the minimum point with reference to the maximum point of the beam formed in the case of $B_w$ which is a combination of a frequency and a distance between array antennas. Furthermore, according to an embodiment of the present disclosure, in order to reduce interference between neighboring spatial filter outputs and expand the spatial filter bandwidth, it is possible to multiple a window function of M*1. The spatial filter realized by math equation (1) may realize a bandwidth expanded filter using the array antenna response at the null point of a typical beam formation. Otherwise, it is possible to realize a bandwidth reduced filter using the array antenna response and window function at the maximum point. In such a case, it is possible to receive input of a spatial interference removal value and remove the interference of a certain spatial bandwidth. Furthermore, as the number of k increases, it is possible to realize a flat zone spatial filter of a fixed size within the pass bandwidth.

Back to FIG. 2, at step 240, all the channels are combined and output.

Such a method for realizing a frequency-spatial filter with variable width according to an embodiment of the present disclosure may be easily standardized, and thus is advantageous in realizing an FPGA (Field-Programmable Gate Array), and may realize a variable bandwidth filter control value regarding a frequency-space using a memory structure.

The aforementioned embodiments of the present disclosure may be realized as commands that may be executed by a processor and may be stored in a computer readable storage medium. In a case where these commands are executed by a processor, means for realizing certain functions/operations of the aforementioned flowchart and/or block diagrams may be generated. Each block of the flowchart/block diagrams may represent a hardware and/or software module or logic that realizes the embodiments of the present disclosure. Furthermore, the functions mentioned in the block diagrams may be performed out of illustrated order or simultaneously.

A computer readable medium may include for example a floppy disc, ROM, flash memory, disc drive memory, CD-ROM, and a nonvolatile memory such as a permanent storage, but without limitation.

Figure 5:
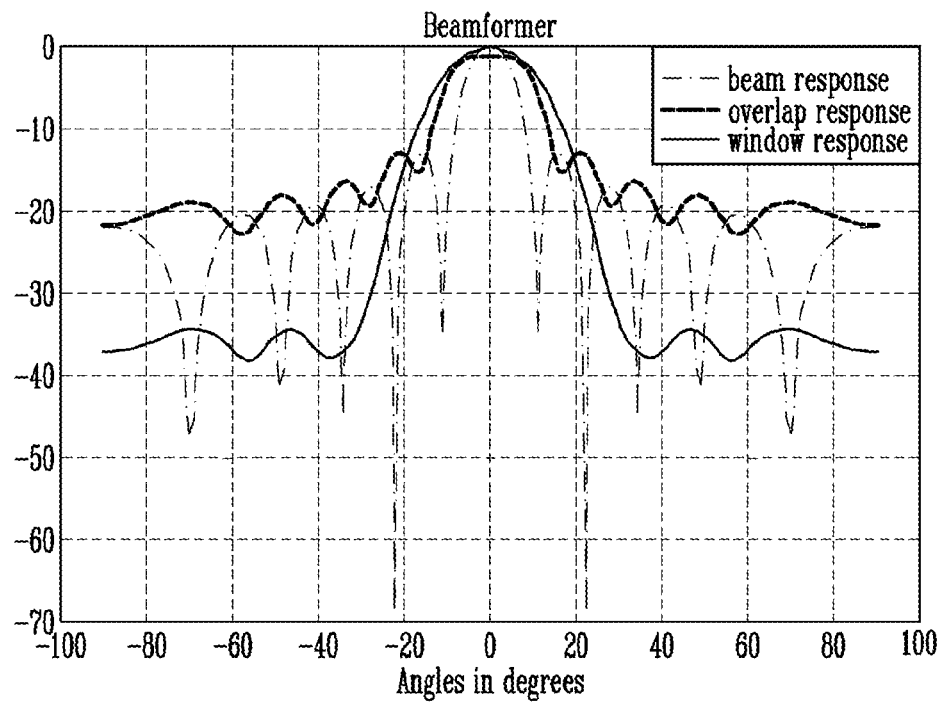
FIG. 5 is a schematic view illustrating expansion of a spatial bandwidth by controlling a spatial filter in a frequency-spatial filter with variable bandwidth according to an embodiment of the present disclosure.

FIG. 5 is a schematic view illustrating expansion of a spatial bandwidth by controlling a spatial filter in a frequency-spatial filter with variable bandwidth according to an embodiment of the present disclosure.

FIG. 5 is a test result of a spatial bandwidth expansion filter, the beam response being a unique beam formation pattern under limited conditions of Bw, and the overlap response and window response being a result of obtaining a $F_{weight}$ and then multiplying the result of step 140 of FIG. 1 with the window function in a case where the number of k is 5 of an array antenna response, maximum point and intermediate point. From FIG. 5, one can see the bandwidth expansion and increase of the flat band. Regarding $F_{weight}$, it is possible to generate and use a null weight (capon beam forming weight) of a certain beam formation in order to spatially remove a great interference signal within a bandwidth.

Figure 6:
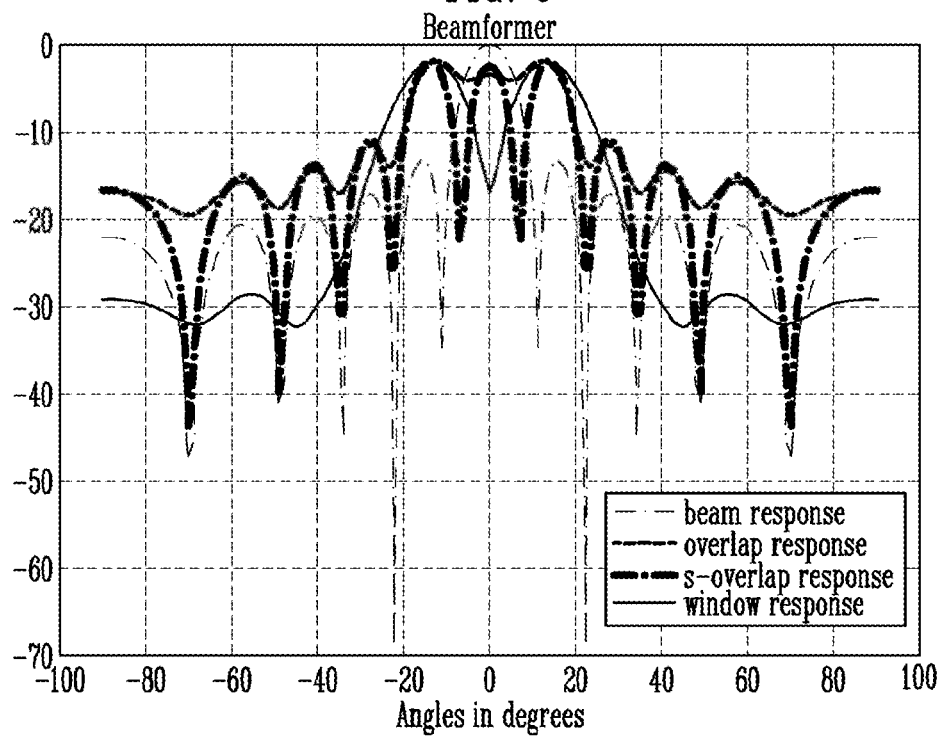
FIG. 6 is a schematic view illustrating reduction of a spatial bandwidth and a simultaneous bandwidth pass by controlling a spatial filter in a frequency-spatial filter with variable bandwidth according to an embodiment of the present disclosure.

FIG. 6 is a schematic view illustrating reduction of a spatial bandwidth and a simultaneous bandwidth pass by controlling a spatial filter in a frequency-spatial filter with variable bandwidth according to an embodiment of the present disclosure.

FIG. 6 illustrates a test result of a spatial bandwidth reduced filter, the beam response being a unique beam formation pattern under limited condition of Bw, and the overlap response being a result of obtaining the $F_{weight}$ and then performing step 140 of FIG. 1 in a case where the number of k is 5 of an array antenna response of the unique beam minimum point, maximum point and intermediate point, and s-overlap response being a result of obtaining $F_{weight}$ and then multiplying the window function in a case where the number of k is 5 of the array antenna response of the unique minimum point, maximum point and intermediate point, wherein three spatial bandwidth filters have been formed based on the maximum point and minimum point of the unique beam. The window response is a result of obtaining $F_{weight}$, and then multiplying the window function in a case where the number of k is 5 such as the twice time array antenna response of the unique beam minimum point, maximum point and intermediate point. If can be seen that two spatial bandwidth filters have been realized wherein the unique beam maximum point becomes the minimum and the beam minimum point becomes the maximum.

It can be seen that various spatial bandwidth expanded filters may be realized by combining array antenna response vectors corresponding to the maximum and minimum points of a typical beam formation pattern based on the aforementioned results.

Figure 7:
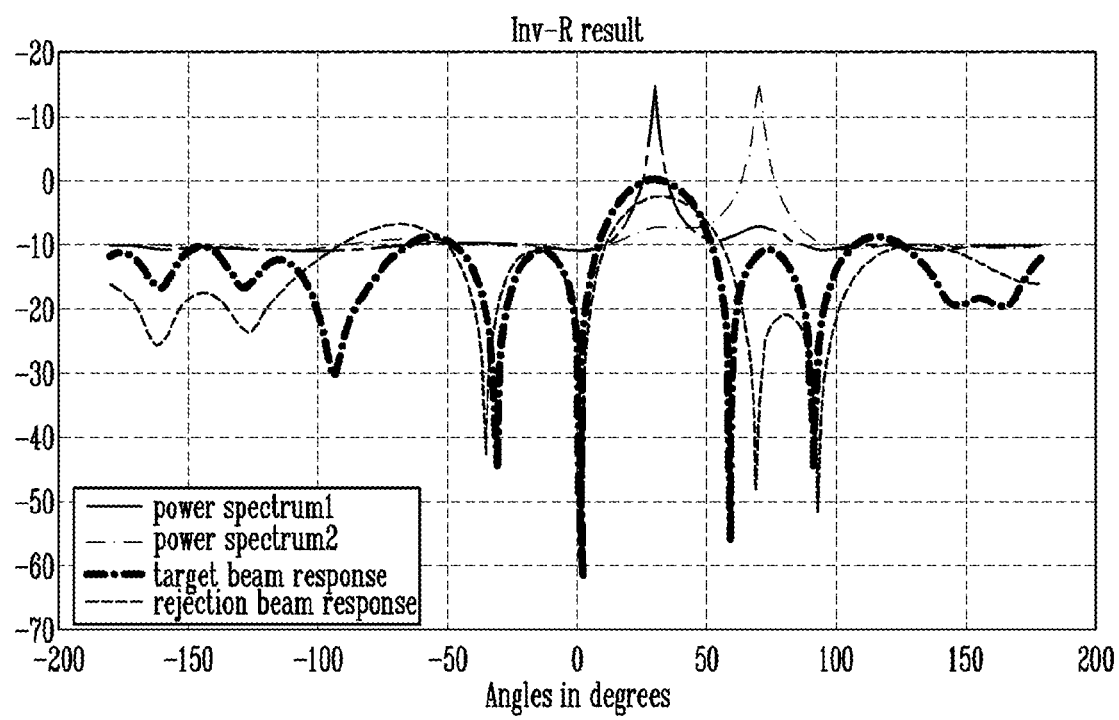
FIG. 7 is a schematic view illustrating removal of a certain spatial interference by controlling a spatial filter in a frequency-spatial filter with variable bandwidth according to an embodiment of the present disclosure.

FIG. 7 is a schematic view illustrating removal of a certain spatial interference by controlling spatial filter in a frequency-spatial filter with variable bandwidth according to an embodiment of the present disclosure.

FIG. 7 illustrates a result of removing interference regarding a certain space instead of a certain space filter, the power spectrum 1 representing a direction of a subject signal (azimuth angle 30°, elevation angle 10°), and power spectrum 2 representing a direction of a signal that should be removed (azimuth angle 60°, elevation angle 40°). In the target beam response, spatial interference is not removed efficiently with the spatial filters explained in FIGS. 5 and 6, but in the rejection beam response of FIG. 7, only the spatial interference is removed precisely and there is a gain regarding the subject signal direction. Therefore, it is possible to strongly remove spatially neighboring interface using a super resolution based coefficient.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A method for realizing a frequency-spatial filter with variable bandwidth, the method comprising:
    executing by at least one controller processor non-transitory computer program code stored on storage media, the non-transitory computer program code comprising:
    program code that generates a first plurality of Fast Fourier Transform (FFT) channel blocks each having a second plurality of channels by performing second plurality point FFT processing using the first plurality of array antenna inputs;
    program code that combines at least two of the second plurality of channels of each FFT channel block according to a frequency bandwidth variable parameter value to provide a first combination;
    program code that combines at least two of spatial response vector channels in the combined channel of each FFT channel block according to a spatial bandwidth variable parameter value to provide a second combination; and
    program code that combines the second combination for each of the channel blocks to provide a third combination frequency-spatial filter with variable bandwidth.

2. The method according to claim 1,
    wherein the combining at least two of spatial response vector channels in the combined channel of each FFT channel block according to a spatial bandwidth variable parameter value comprises:
    setting the spatial bandwidth variable parameter value; and
    setting a bandwidth by multiplying a window function for expanding or reducing a spatial bandwidth and a response vector of an array antenna based on the spatial bandwidth variable parameter value.

3. The method according to claim 2,
    wherein the setting a bandwidth by multiplying a window function for expanding or reducing a spatial bandwidth and a response vector of an array antenna based on the spatial bandwidth variable parameter value involves using an array antenna response of a null point in a beam being formed.

4. The method according to claim 2,
    wherein the setting a bandwidth by multiplying a window function for expanding or reducing a spatial bandwidth and a response vector of an array antenna based on the spatial bandwidth variable parameter value involves using an array antenna response and a window function of a maximum point in a beam being formed.

5. The method according to claim 2,
    further comprising performing a removal of a spatial bandwidth interference using the response vector of the array antenna and the window function.

6. The method according to claim 2,
    wherein the setting the spatial bandwidth variable parameter value involves setting the spatial bandwidth variable parameter value with an input of at least one of a central frequency of a broadband signal, distance between array antennas, and incidence direction of the signal.

7. The method according to claim 1,
    wherein the combining at least two of spatial response vector channels in the combined channel of each FFT channel block according to a spatial bandwidth variable parameter value comprises setting a weighted frequency ($F_{weight}$) that is realized by math equation below:

$$F_{weight} = \sum_{L=cen-k}^{cen+k} [A_L * W_{coeff}]$$

$A_L$ being an $L^{th}$ row vector of the first plurality*1 of an array antenna response vector,
$W_{coeff}$ being a window function, and
Cen being a spatial central frequency.

8. The method according to claim 7,
    wherein the bandwidth is proportionate to a distance between array antennas and frequency.

9. The method according to claim 8,
    wherein a maximum value of k is the same or smaller than an absolute value of a minimum point with reference to a maximum point of a beam being formed by the bandwidth.

10. An apparatus for realizing a frequency-spatial filter with variable bandwidth, the apparatus comprising:
    a controller processor that executes non-transitory computer program code stored on storage media, the non-transitory computer program code comprising:
    program code that generates a first plurality of Fast Fourier Transform (FFT) channel blocks having a second plurality of channels by performing a second plurality point FFT processing using the first plurality of array antenna inputs;
    program code that combines at least two of the second plurality of channels of each FFT channel block according to a frequency bandwidth variable parameter value to provide a first combination;
    program code that combines at least two of spatial response vector channels in the combined channel of each FFT channel block according to a spatial bandwidth variable parameter value to provide a second combination; and
    program code that combines the second combination for each of the channel blocks to provide a third combination frequency-spatial filter with variable bandwidth.

* * * * *